United States Patent

[11] 3,593,171

[72] Inventor Gerhard Gunter Gassmann
Berkheim, Germany
[21] Appl. No. 841,764
[22] Filed July 15, 1969
[45] Patented July 13, 1971
[73] Assignee International Standard Electric Corporation
New York, N.Y.
[32] Priority Sept. 21, 1968
[33] Germany
[31] P 17 62 917.3

[54] FREQUENCY DISCRIMINATOR HAVING CONDUCTION CONTROLLED MEANS
10 Claims, 10 Drawing Figs.

[52] U.S. Cl. .......... 329/102, 307/233, 307/246, 328/140, 329/103, 329/104, 329/110

[51] Int. Cl. .......... H03d 1/18; H03d 3/00

[50] Field of Search .......... 329/102, 110, 103, 104; 307/246, 233; 328/140; 325/349, 487

[56] References Cited

UNITED STATES PATENTS

| | | | |
|---|---|---|---|
| 3,149,243 | 9/1964 | Garfield | 307/233 X |
| 3,163,826 | 12/1964 | Kemper | 329/103 |
| 3,305,732 | 2/1967 | Grossman et al. | 307/233 |
| 3,506,848 | 4/1970 | Beurrier | 307/246 X |

*Primary Examiner*—Alfred L. Brody
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: A frequency discriminator for frequency-modulated (FM) pulse signals having a steep discriminator characteristic. The FM pulse signals are amplitude limited, differentiated and then rectified. The time constant of a subsequent RC circuit and the fixed bias applied to the RC circuit are so selected to produce a linear sawtooth signal having a duration equal to the period of the FM pulse signals so that a subsequent transistor is always blocked at pulse frequencies above $f_{max}$, unblocked momentarily at pulse frequencies between $f_{min}$ and $f_{max}$ to pass pulses with an amplitude increasing in the negative direction linearly as the frequency decreases, and passes constant maximum negative going amplitude pulses at pulse frequencies below $f_{min}$. The discriminator output voltage is obtained by peak rectification of the pulses passed by the transistor. In another disclosed embodiment, the discriminator output voltage is passed through a low pass filter to provide the bias for the RC circuit.

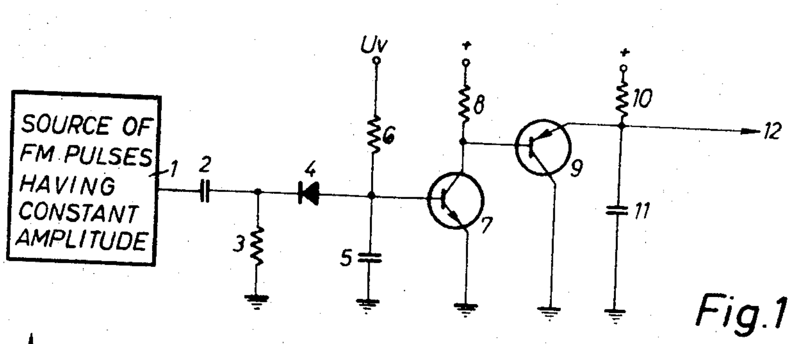
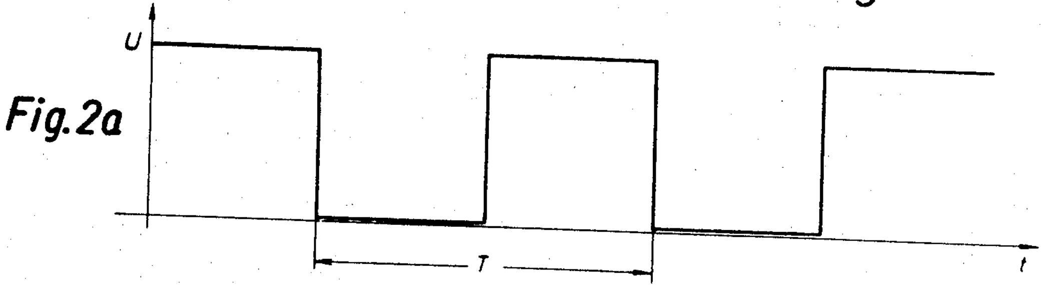
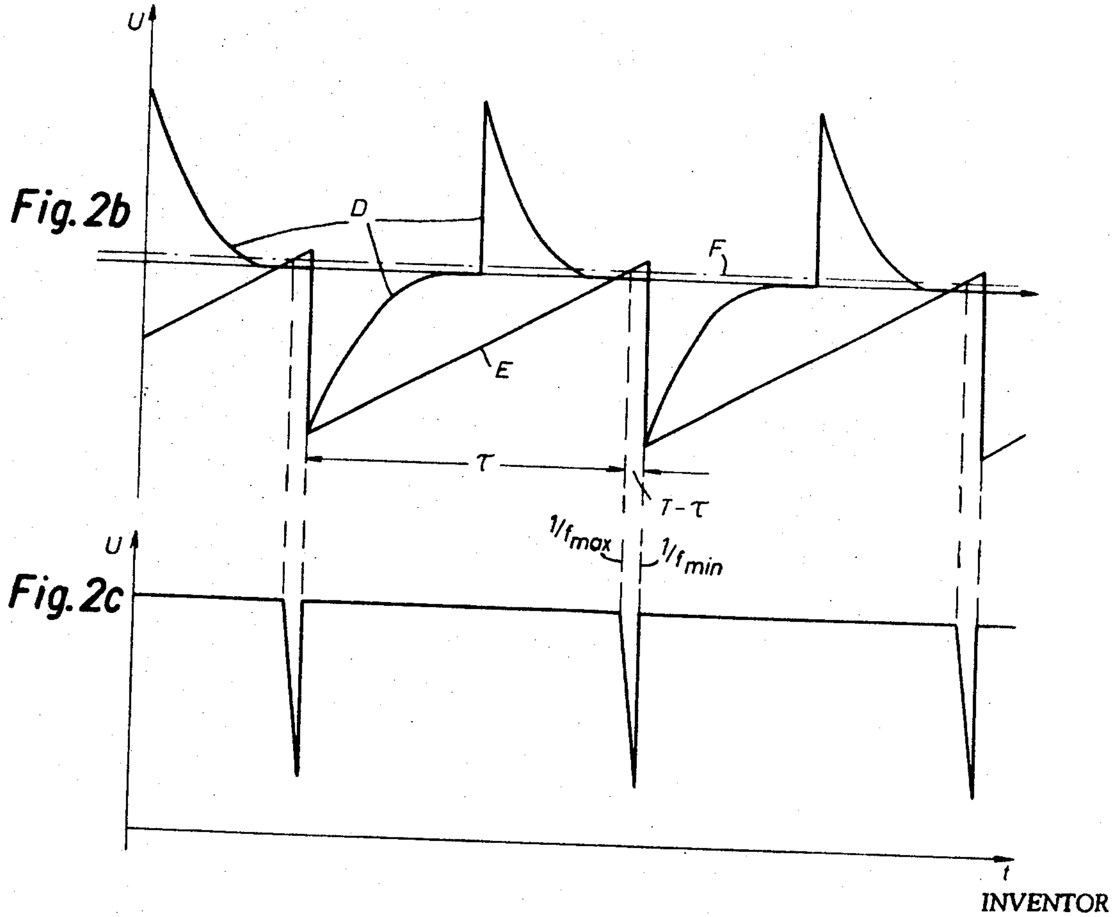
Fig.2b, Fig.2c
INVENTOR
GERHARD GÜNTER GASSMANN
BY Alfred C. Hill
AGENT INVENTOR
GERHARD GÜNTER GASSMANN
BY Alfred C. Hill
AGENT INVENTOR
GERHARD GÜNTER GASSMANN
BY Alfred C. Hill
AGENT

FREQUENCY DISCRIMINATOR HAVING CONDUCTION CONTROLLED MEANS

BACKGROUND OF THE INVENTION

This invention relates to frequency discriminators and more particularly to frequency discriminators for frequency modulated FM pulse signals.

Conventional types of frequency discriminators with a high steepness to the discriminator characteristic relative to the center frequency of the characteristic operate with one or more oscillating circuits, and hence, with sinusoidal signals.

Frequency discriminators are known which are suitable for pulse signals, and in which no oscillating circuits are used. These types of discriminator circuits, however, have a very low steepness to the discriminator characteristic. These discriminators operate, for example, according to the pulse counting principle. The output voltage of these discriminators is directly in proportion to the frequency. The characteristic of these discriminators is represented by an inclined straight line extending through the zero point at ($f$=0). In consequence of this, the efficiency of such a discriminator, in the case of signals having a small ratio of ($\Delta f/f$), is very low.

In addition thereto, however, there is also known a frequency discriminator having a characteristic of the discriminator output voltage similar to that of the present invention. This discriminator operates by utilizing the blocking delay time of semiconductor elements, and is in particular intended for the use in integrated circuits by avoiding the employment of capacitors and coils. Since this type of discriminator is based on the utilization of the blocking delay time of semiconductors, the linearity of the discriminator characteristic in the operating region is dependent upon semiconductor properties which are difficult to control. In addition thereto, it is the principle of this discriminator, that it also responds to variations in the pulse duration. For this reason, and for the purpose of avoiding this sensitivity, this discriminator must be preceded by an additional pulse width limiter. Moreover, this discriminator is unsuitable for low frequencies, because the blocking delay time of semiconductors cannot be extended at will.

SUMMARY OF THE INVENTION

An object of the present invention is to provide a frequency discriminator for FM pulse signals overcoming the disadvantages of the above-mentioned prior art frequency discriminators.

Another object of the present invention is to provide a frequency discriminator for FM pulse signals having a steep, linear rise in the discriminator characteristic in the operating region between the frequencies $f_{min}$ and $f_{max}$.

Still another object of the present invention is to provide a frequency discriminator for FM pulse signals which is independent of pulse width variations over a wide range of pulse width variations.

A further object of the present invention is to provide a frequency discriminator for FM pulse signals which is suitable for employment with very low frequencies.

In accordance with the present invention the frequency discriminator provides a discriminator output voltage derived from FM pulse signals having an amplitude value $U_{min}$ at the frequency $f_{min}$, an amplitude value smaller or equal to $U_{min}$ below frequency $f_{min}$, an amplitude value $U_{max}$ at and above the frequency $f_{max}$, and a step rising, substantially linear amplitude value from $U_{min}$ to $U_{max}$ between $f_{min}$ and $f_{max}$.

A feature of this invention is the provision of a frequency discriminator for FM pulse signals comprising a source of FM pulse signals having a constant amplitude; first means coupled to the source to convert the pulse signals to substantially linear sawtooth signals having a duration equal to the period of the pulse signals; conduction controlled means coupled to the first means responsive to the sawtooth signals; and second means coupled to the conduction controlled means for rectification of the output signal thereof to provide the discriminator output voltage.

The frequency discriminator of this invention offers the advantage of (1) being suitable for arbitrarily low frequencies, (2) of having a steep linear portion in the discriminator characteristic within the operating range between the frequencies $f_{min}$ and $f_{max}$, with the inclination of this portion and the linearity thereof being capable of being controlled in a relatively simple way with the aid of circuit-technical means and, (3) outside the range $f_{min}$ to $f_{max}$, in the case of a peak rectification and employing smoothing capacitors, the discriminator characteristic has an absolutely horizontal path. The last-mentioned property is particularly desirable when employing the frequency discriminator in control circuits, (for example, in speed regulators for motors), because in control circuits an inverted inclination of the characteristic in relation to the operating characteristic, would cause considerable problems. Even in the case of considerable deviations from the actual operating range, the discriminator output voltage will maintain a value corresponding to the respective minimum or maximum value, respectively, so that there is available a criterion for the necessary detuning direction. When employing a mean value rectification, however, the discriminator output voltage, in the case of frequencies smaller that $f_{min}$, will further decrease, and, thus, the characteristic is no longer horizontal. Moreover, in the case of a mean value rectification, the rectifier efficiency drops off considerably.

BRIEF DESCRIPTION OF THE DRAWING

The above-mentioned and other features and objects of this invention will become more apparent by reference to the following description taken in conjunction with the accompanying drawings, in which:

FIG. 1 is a schematic diagram of a frequency discriminator in accordance with the principles of the present invention;

FIGS. 2, 3 and 4 are curves useful in explaining the operation of the discriminator of FIG. 1.

DESCRIPTION OF THE PREFERRED EMBODIMENTS

Figure 3A:
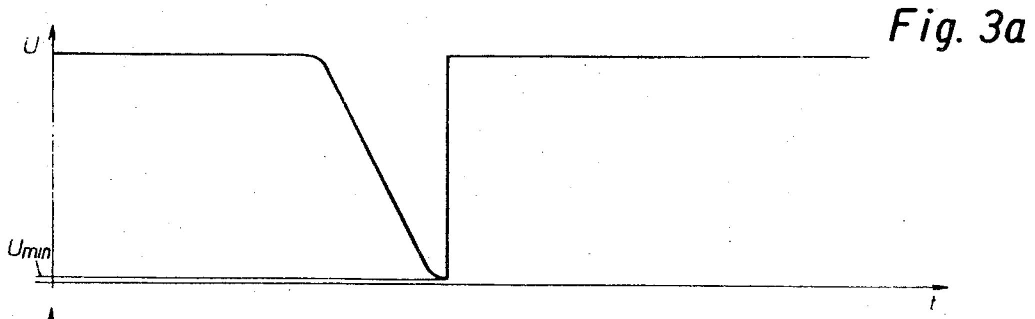
Figure 3B:
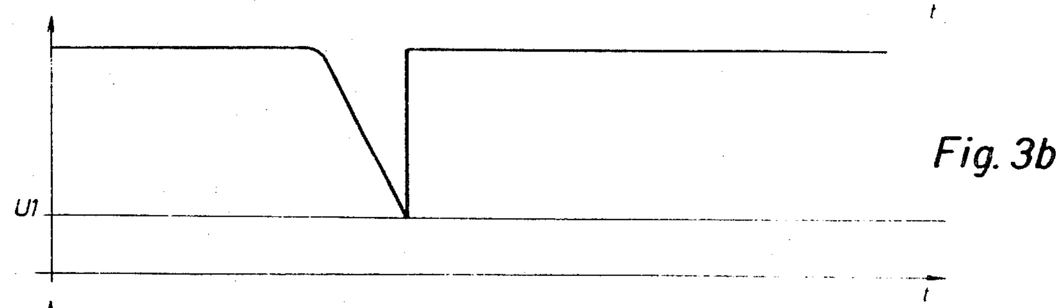
Figure 3C:
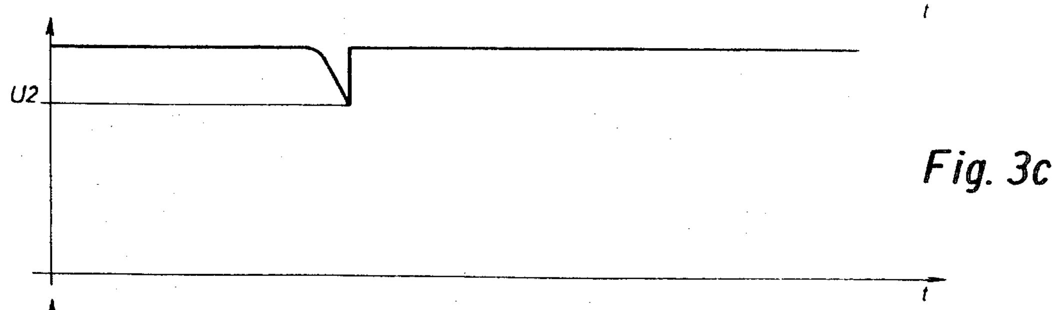

Referring to FIG. 1, source 1 provides pulse-shaped input signals, which are supplied already limited to a constant amplitude value, or has been limited in an amplitude limiter circuit of a known type, as the input signal to the frequency discriminator of the present invention. With the aid of the RC circuit 2, 3, the pulse-shaped signals are differentiated, with the time constant thereof being so dimensioned that in the case of signal frequencies ranging between $f_{min}$ and $f_{max}$, the voltage at resistor 3, as a function of time, and between the pulse edges, has dropped to almost zero volts. The differentiated voltage at resistor 3 is coupled to diode rectifier 4 and then to the RC circuit 5, 6. A rectifier biasing potential $U_V$ being applied to resistor 6 of this time constant circuit. The sawtooth voltage resulting at capacitor 5 is fed to transistor stage 7 which, in the illustrated example, consists of a NPN-type transistor. Resistor 8 is the collector resistor of transistor 7. Transistor 9 operating in a grounded collector arrangement functions as a peak rectifier of high input resistance and which, in the present example, is designed as a transistor of the PNP conductivity type. Resistor 10 is the operating resistor of this rectifier, and capacitor 11 is the blocking capacitor. From the emitter of transistor 9, the discriminator output voltage is removed by terminal 12. In cases where both resistor 10 and the loading of the terminal 12 have a relatively high resistive value, it is possible to use a diode instead of the transistor rectifier 9.

The mode of operation 1the circuit of FIG. 1 can be explained with reference to FIG. 2a to 2c. FIG. 2a illustrates the input pulse signal which is restricted to a constant amplitude value from source 1. This input signal may not only have a pulse ratio of 1: 1, but may also have other pulse ratios as is usual in FM pulse signals. T indicates the duration of the period of the pulse signal. The portion D in FIG. 2*b* indicates the differentiated voltage appearing at resistor 3. With the negative peak of these voltages, rectifier 4 is brought into the conductive state, so that capacitor 5 charges itself up to almost this negative peak value. Subsequently thereto, capacitor 5 is discharged across resistor 6. The discharging of capacitor 5 is controlled by employing the biasing potential $U_V$. In the case of a high voltage $U_V$, there is produced a substantially linear sawtooth voltage Curve E, FIG. 2*b*. Upon expiration of the time $\tau$, the voltage at capacitor 5 will reach a voltage value of about 0.7 volt, at which time transistor 7 starts to become conductive. This voltage value is indicated in FIG. 2*b* by dot-and-dash line F. FIG. 2*c* illustrates the voltage at the collector of transistor 7. Throughout the entire range $\tau$, this voltage has its maximum value, because transistor 7 is not conductive within this time range. Within the remaining time range $(T-\tau)$, the collector voltage decreases substantially linearly.

Upon expiration of the time T, the negative pulse peak will again appear at resistor 3 owing to which, and via rectifier 4, transistor 7 is reblocked. Depending on the width of the time range $(T-\tau)$ which is controlled by the period (the modulation) of the FM pulses signal, the amplitude of the pulses appearing at the collector of transistor 7 varies. Since, in the present example, these collector pulses are directed negatively, there is appropriately used a PNP-type transistor, or a correspondingly polarized diode for providing the peak rectification of these pulses. At the output of the peak rectifier transistor 9, there will thus appear a rectified voltage which is almost identical to the peak value of the voltage pulses appearing at the collector of transistor 7. From this representation it may be recognized that in the case of higher pulse signal frequencies, in which the duration of period T is shorter than the time $\tau$, (Curve E going negative prior to crossing line F) transistor 7 will always remain blocked, so that accordingly, the output voltage appearing at terminal 12, will be identical to the supply voltage which, in this particular case, is positive. In the case of pulse signal frequencies having a period duration T, which is only slightly higher than the duration $\tau$, but less than $\tau+(T-\tau)$ (Curve E going negative within time interval $(T-\tau)$, the discriminator output voltage assumes values lying between the supply voltage and a voltage of almost zero volts. In the case of lower pulse signal frequencies, with which T is noticeably greater than $\tau+(T-\tau)$ (Curve E going negative after the time interval $\tau+(T-\tau)$, transistor 7 is completely driven into saturation, so that its output pulses will have a constant amplitude, and the discriminator output voltage at terminal 12 will always remain at almost zero volts.

In FIGS. 3*a* to 3*d* the pulse voltage at the collector of transistor 7 is shown in an expanded fashion with respect to various frequencies lying within the operating range $f_{min}$ to $f_{max}$. As will be recognized therefrom, the amplitude value of these pulses increases almost linearly in the negative direction, and the voltage $U_{min}$ in FIG. 3*a* corresponds to the value of the discriminator output voltage in the case of pulse signal frequencies below $f_{min}$.

Figure 3D:
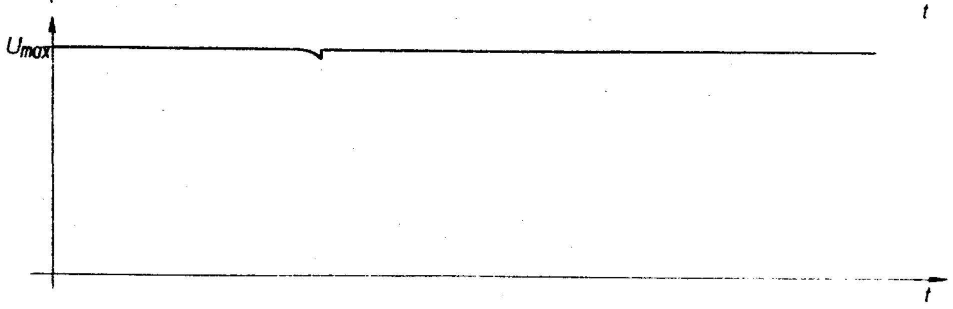

The value $U_{max}$ of FIG. 3*d* corresponds to the voltage value of pulse signal frequencies at and above $f_{max}$. The voltages $U_1$ and $U_2$ in FIGS. 3*b* and 3*c* correspond to the pulse signal frequencies $f_1$ and $f_2$ between the values $f_{min}$ and $f_{max}$.

Figure 4:
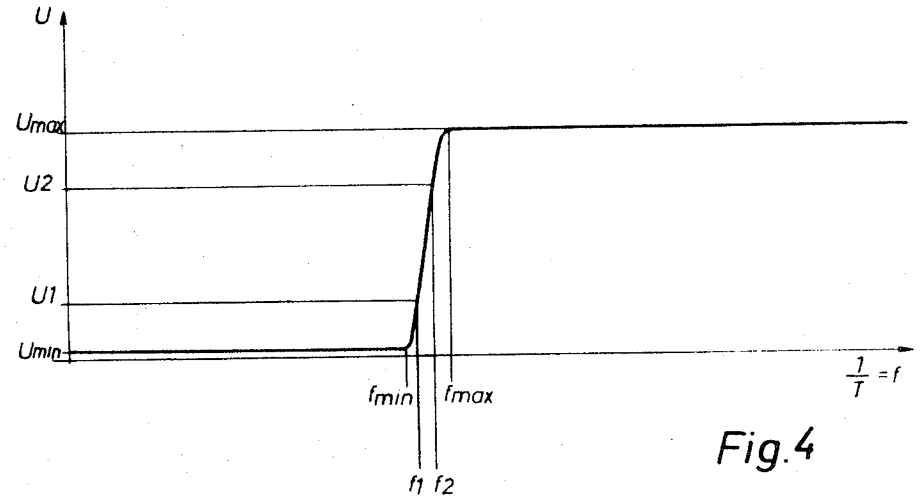

In FIG. 4, the discriminator characteristic, the function of the discriminator output voltage versus the pulse signal frequency, is plotted. In this FIG. identical parts are again indicated by the same reference symbols as in FIGS. 2 to 3.

Figure 5:
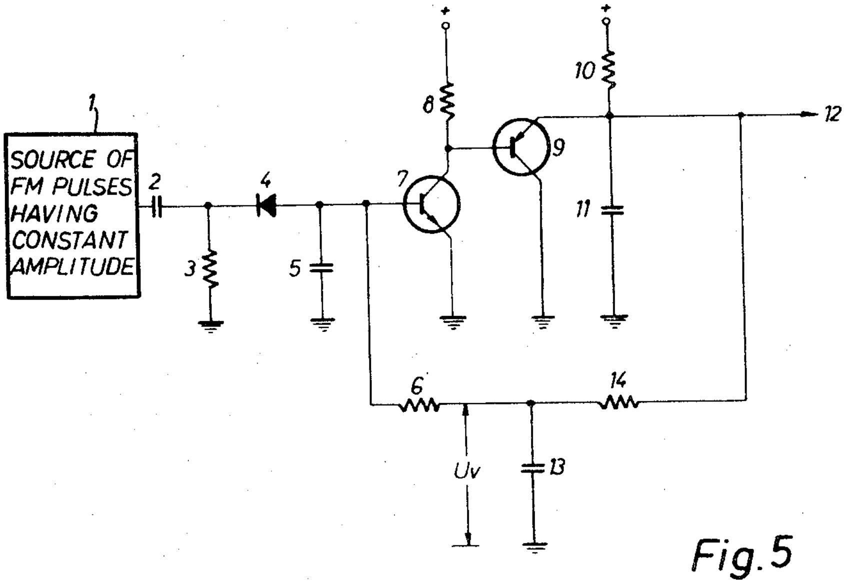
FIG. 5 is a schematic diagram of another embodiment of the frequency discriminator of the present invention.

In FIG. 5, identical parts are again indicated by the same reference numerals as in FIG. 1. The arrangement according to FIG. 5 only differs from the arrangement according to FIG. 1 in that the biasing potential $U_V$ for the first rectifier 4 is not a fixed one, but is dependent upon or identical to the mean value of the discriminator output voltage. By this measure it is achieved that in the case of frequency-modulated signals, the dynamic characteristic, now as before, is a very steep one, whereas the static characteristic takes an extremely flat course, so that tolerances can be completely absorbed and a balancing of the circuit is rendered superfluous. If, for example, the static value of the discriminator output voltage drops off, e.g., owing to any aging of components, or the like, then also the voltage $U_V$ will drop off, which is obtained from the discriminator output voltage by filtering with the aid of the RC low-pass filter 13, 14. Owing to this dropping of the voltage $U_V$, the period to time $\tau$ is extended, so that the negative pulse peaks at the collector of transistor 7 and, consequently, the discriminator output voltage will increase. It will be recognized from this, that this circuit arrangement has an extremely strong feedback effect. The low frequency of the discriminator output voltage appearing in the case of frequency-modulated input signals, however, is not feedback, because the time constant of the circuit elements 13, 14 is so dimensioned that even the lowest low frequency voltage cannot modulate the time $\tau$, or only to a negligibly small extent. Owing to this strong feedback resulting from the feedback path, it is rendered possible that the discriminator can automatically tune itself to the frequency of the input signal. The input frequency may thereby vary within wide limits, e.g., 1:20.

In cases where the steep portion of the discriminator characteristic is supposed to have the opposite slope, it is necessary to use instead of the NPN-type transistor 7, a transistor of the PNP conductivity type, and instead of the PNP transistor 9, one of the NPN conductivity type. In addition thereto, rectifier 4 must be connected with opposite polarity. In addition thereto, both the battery or supply voltage and the biasing potential $U_V$ must be given an opposite or reversed polarity.

While I have described above the principles of my invention in connection with specific apparatus, it is to be clearly understood that this description is made only by way of example.

I claim:

1. A frequency discriminator for frequency-modulated pulse signals comprising:

a source of frequency-modulated pulse signals having a constant amplitude;

first means having an input coupled to said source to convert said pulse signals to substantially linear sawtooth signals having a duration equal to the period of said pulse signals and an output for said sawtooth signals;

conduction-controlled means having an input coupled to said output of said first means and an output, said conduction controlled means being responsive to said sawtooth signals; and second means having an output and an input coupled to said output of said conduction controlled means for rectification of the output signal thereof to provide at the output of said second means the discriminator output voltage.

2. A discriminator according to claim 1, wherein said second means includes a peak rectifier.

3. A discriminator according to claim 2, wherein said peak rectifier includes a transistor connected in a grounded collector circuit arrangement.

4. A discriminator according to claim 1, wherein said conduction controlled means includes a transistor circuit, said transistor being rendered nonconductive when the frequency of said pulse signals is above a given maximum frequency, momentarily conductive when the frequency of said pulse signals is between said given maximum frequency and a given minimum frequency to pass pulses whose amplitude increases linearly in a negative direction as the frequency of said pulse signals decrease, and saturated when the frequency of said pulse signals is below said given minimum frequency.

5. A discriminator according to claim 1, wherein said first means includes third means coupled to said source to differentiate said pulse signals;

fourth means coupled to said third means to rectify said differentiated pulse signals; and fifth means having a given time constant coupled to said fourth means responsive to said rectified, differentiated pulse signals to produce said sawtooth signals.

6. A discriminator according to claim 5, wherein said fifth means includes a resistor-capacitor time constant circuit, and sixth means coupled to said time constant circuit to provide a bias potential therefore.

7. A discriminator according to claim 6, wherein said sixth means includes a source of fixed bias potential.

8. A discriminator according to claim 7, wherein said sixth means includes seventh means coupled between said second means and said time constant circuit to provide said bias potential varying according to said discriminator output voltage.

9. A discriminator according to claim 8, wherein said seventh means includes a low-pass filter.

10. A discriminator according to claim 1, wherein said first means includes a differentiator coupled to said source of pulse signals, a rectifier coupled to said differentiator, a source of bias potential, and a resistor-capacitor time constant circuit coupled to said source of bias potential and said rectifier to produce said sawtooth signals;

said conduction controlled means includes a NPN-type transistor circuit, said transistor being rendered nonconductive when the frequency of said pulse signals is above a given maximum frequency, momentarily conductive when the frequency of said pulse signals is between said given maximum frequency and a given minimum frequency to pass pulses whose amplitude increases linearly in a negative direction as the frequency of said pulse signals decrease, and saturated when the frequency of said pulse signals is below said given minimum frequency; and said second means includes a peak rectifier having a PNP-type transistor connected in a grounded collector circuit arrangement.